(12) United States Patent
Ohba et al.

(10) Patent No.: US 9,048,771 B2
(45) Date of Patent: Jun. 2, 2015

(54) INVERTER

(71) Applicant: KABUSHIKI KAISHA TOYOTA JIDOSHOKKI, Kariya-shi, Aichi-ken (JP)

(72) Inventors: Tomohiro Ohba, Kariya (JP); Toshiaki Nagase, Kariya (JP); Tomohiro Yamagami, Kariya (JP); Naohito Kanie, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 186 days.

(21) Appl. No.: 13/939,796

(22) Filed: Jul. 11, 2013

(65) Prior Publication Data

US 2014/0015461 A1    Jan. 16, 2014

(30) Foreign Application Priority Data

Jul. 12, 2012  (JP) ................. 2012-156718

(51) Int. Cl.
  *G05D 23/24*  (2006.01)
  *H02P 6/20*  (2006.01)
  *H02P 29/00*  (2006.01)

(52) U.S. Cl.
  CPC ............... *H02P 6/20* (2013.01); *H02P 29/005* (2013.01)

(58) Field of Classification Search
  USPC ........ 318/471–473, 445; 324/548; 322/34, 35
  See application file for complete search history.

(56) References Cited

U.S. PATENT DOCUMENTS

| 7,859,207 B2* | 12/2010 | Yamada et al. | 318/400.02 |
| 8,027,181 B2* | 9/2011 | Hamatani | 363/98 |
| 8,421,468 B2* | 4/2013 | Ono et al. | 324/430 |
| 8,823,292 B2* | 9/2014 | Sumi et al. | 318/34 |
| 2009/0315518 A1* | 12/2009 | Soma et al. | 320/134 |

FOREIGN PATENT DOCUMENTS

| JP | 2006191775 A | 7/2006 |
| JP | 2009-060776 A | 3/2009 |

* cited by examiner

*Primary Examiner* — Rita Leykin
(74) *Attorney, Agent, or Firm* — Sughrue Mion, PLLC

(57) ABSTRACT

An inverter includes a warm-up control section and a switching control section. In a state in which an electric motor is not operating, the warm-up control section controls switching elements of an inverter circuit to perform warm-up control, in which direct currents are supplied to the coils of the respective phases of the electric motor, when the temperature of the capacitor is lower than a prescribed temperature. When a warm-up control is switched to a normal operation control, the switching control section sets initial phases of alternating currents such that the relationship between the values of the alternating currents supplied to the coils of the electric motor in the normal operation control matches with the relationship between the values of the direct currents that have been supplied to the corresponding coils of the electric motor in the warm-up control.

9 Claims, 4 Drawing Sheets

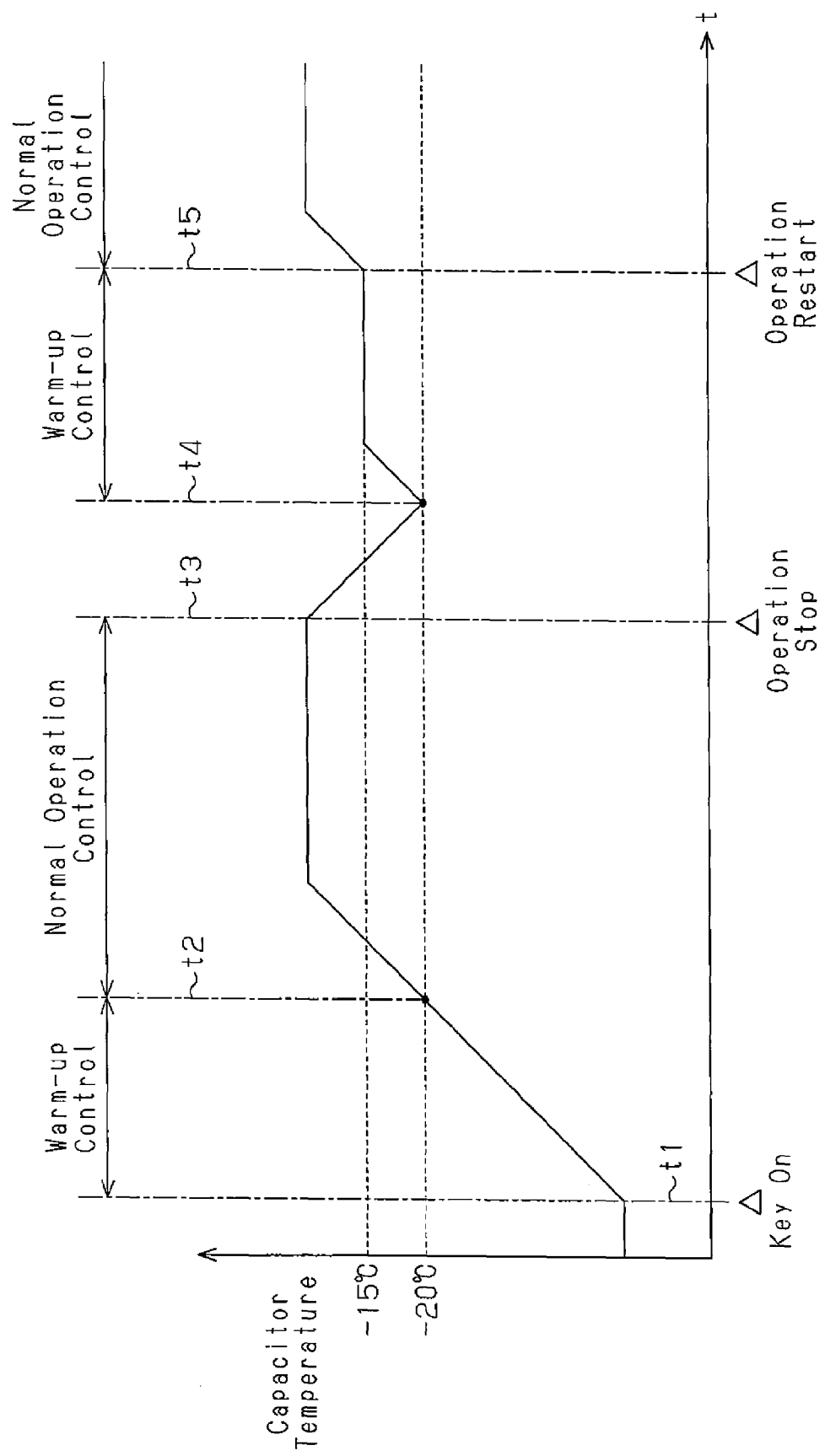

INVERTER

BACKGROUND OF THE INVENTION

The present invention relates to an inverter.

Japanese Laid-Open Patent Publication No. 2009-60776 discloses an electric motor controlling method that increases the temperature of a capacitor of an inverter device when the ambient temperature is low. Specifically, depending on the ambient temperature of the inverter device, a ripple voltage is generated by the equivalent series resistance of the capacitor. The maximum allowable motor current value at which the components of the inverter device are not damaged by the ripple voltage is set using a map or a relational expression representing a relationship between the maximum value of the motor current and the temperature. In an temperature range in which the set maximum allowable motor current value is lower than the value capable of generating torque required for starting the electric motor, the position of the rotor of the electric motor is estimated and a direct current lower than or equal to the maximum allowable motor current value are supplied as a d-axis current to increase the temperature of the capacitor of the inverter device. After the temperature of the capacitor reaches and exceeds a temperature at which the maximum allowable motor current value is capable of generating the torque for starting the electric motor, the inverter device is controlled to supply alternating currents to the electric motor.

In an electric motor and an inverter device that are used under a low-temperature environment, even if the electric motor is normally started after a warm-up control is performed to sufficiently increase the temperature of the capacitor of the inverter device, the inverter device will be under a low-temperature environment when the electric motor is stopped or temporarily stopped. As a result, the temperature of the capacitor will be lowered again. Also, for smoothly starting an electric motor under a low-temperature environment, warm-up control for increasing the capacitor temperature needs to be smoothly shifted to normal operation control for normally driving the electric motor.

SUMMARY OF THE INVENTION

Accordingly, it is an objective of the present invention to provide an inverter that is capable of smoothly shifting from warm-up control to normal operation control while taking into consideration a case in which the capacitor is left unattended in a low-temperature environment after being heated.

In accordance with one aspect of the present invention, an inverter is provided that is adapted for supplying alternating currents to an electric motor having coils forming a plurality of phases to drive the electric motor. The inverter includes an inverter circuit, a capacitor, a temperature detecting section, a warm-up control section, and a switching control section. The inverter circuit has a plurality of switching elements in a bridge connection. The inverter circuit has a pair of input terminals, which are configured to be connected to a direct-current power source, and a plurality of output terminals, which is configured to be connected to the coils of the respective phases of the electric motor. The capacitor is connected to the pair of input terminals of the inverter circuit. The temperature detecting section detects a temperature of the capacitor. In a state in which the electric motor is not operating, the warm-up control section controls the switching elements of the inverter circuit to perform warm-up control, in which direct currents are supplied to the coils of the respective phases of the electric motor, when the temperature of the capacitor detected by the temperature detecting section is lower than a prescribed temperature. When the warm-up control is switched to a normal operation control, in which alternating currents are supplied to the coils of the respective phases of the electric motor, the switching control section sets initial phases of the alternating currents such that the relationship between the values of the alternating currents supplied to the coils of the electric motor in the normal operation control matches with the relationship between the values of the direct currents that have been supplied to the corresponding coils of the electric motor in the warm-up control.

In accordance with another aspect of the present invention, an inverter is provided that is adapted for supplying alternating currents to an electric motor having coils forming a plurality of phases to drive the electric motor. The inverter includes an inverter circuit, a capacitor, a temperature detecting section, a warm-up control section, and a switching control section. The inverter circuit has a plurality of switching elements in a bridge connection. The inverter circuit has a pair of input terminals, which is configured to be connected to a direct-current power source, and a plurality of output terminals, which are configured to be connected to the coils of the respective phases of the electric motor. The capacitor is connected to the input terminals of the inverter circuit. The temperature detecting section detects a temperature of the capacitor. In a state in which the electric motor is not operating, the warm-up control section controls the switching elements of the inverter circuit to perform warm-up control, in which direct currents are supplied to the coils of the respective phases of the electric motor, when the temperature of the capacitor detected by the temperature detecting section is lower than a prescribed temperature. When the warm-up control is switched to a normal operation control, in which alternating currents are supplied to the coils of the respective phases of the electric motor, the switching control section sets initial phases of the alternating currents supplied to the respective coils of the electrical motor in the normal operation control in line with the electrical degrees of the direct currents that have been supplied to the respective coils of the electrical motor in the warm-up control.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a time chart showing changes of the temperature of a capacitor;

DETAILED DESCRIPTION OF THE PREFERRED EMBODIMENTS

Hereafter, a forklift according to one embodiment will be described. The forklift is used in a refrigeration warehouse. The forklift is a battery forklift. The forklift is driven by a vehicle driving electric motor and performs cargo handling with a cargo handling electric motor. That is, with the key at the ON position, when an operator manipulates the accelerator pedal, the vehicle driving electric motor is activated to drive the forklift. When the operator manipulates the lift lever, the cargo handling electric motor is activated to lift or lower the fork to handle a cargo. The temperature specification of the forklift is approximately from −40° C. to 80° C.

Figure 1:
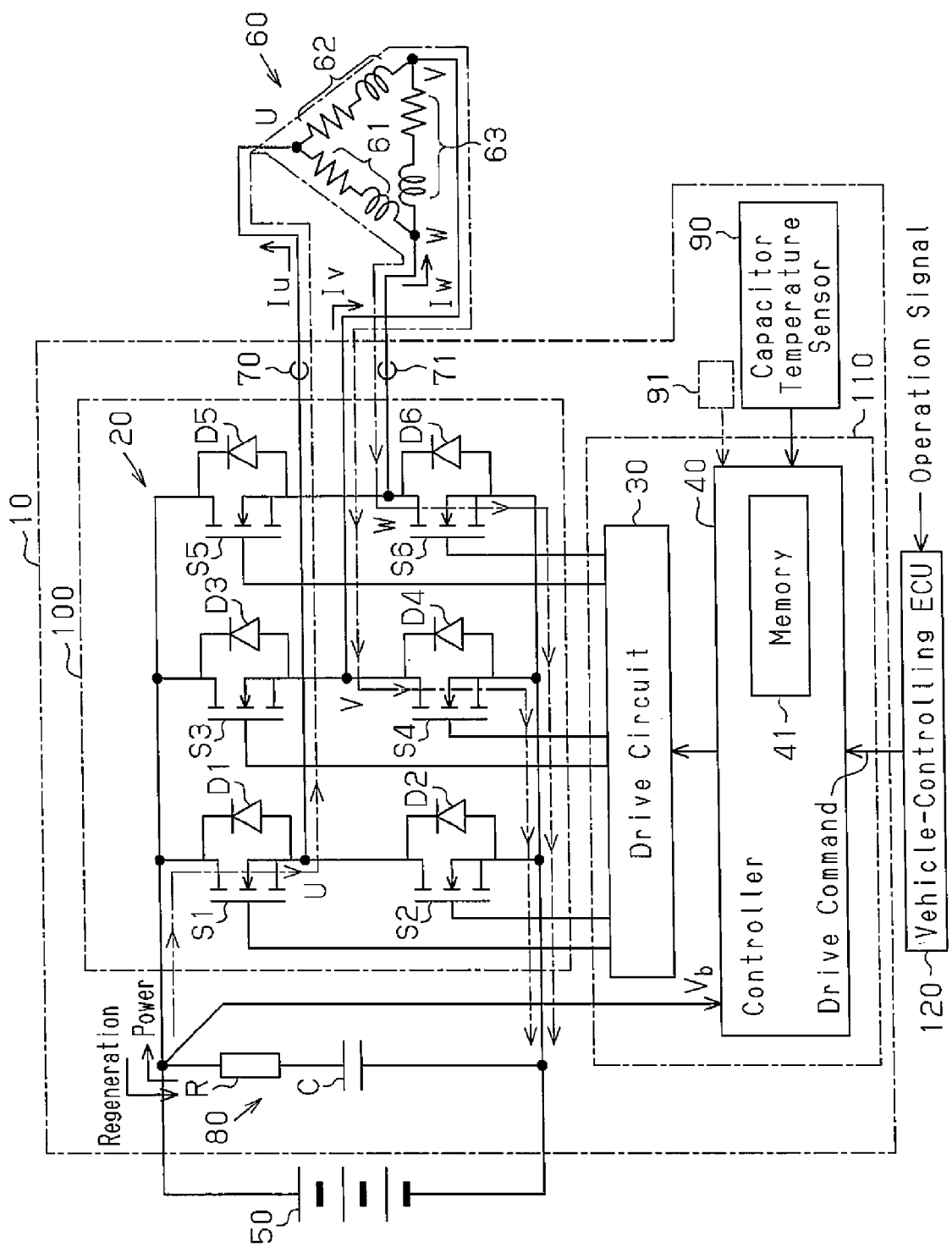
FIG. 1 is a circuit diagram showing an inverter according to one embodiment.

As shown in FIG. 1, a three-phase inverter 10 includes an inverter circuit 20, a drive circuit 30, and a controller 40. A pair of input terminals of the inverter circuit 20 is connected to a battery 50, which serves as a direct-current power source. A plurality of output terminals of the inverter circuit 20 are connected to a vehicle driving electric motor (alternatively, a cargo handling electric motor) 60. A three-phase AC motor is used as the motor 60. The electric motor 60 includes coils 61, 62, 63 of different phases, which are connected to the output terminals of the inverter circuit 20.

The inverter circuit 20 has six switching elements S1 to S6. Each of the switching elements S1 to S6 is a power MOSFET. As switching elements, insulated-gate bipolar transistors (IGBT) may be used as switching elements. The switching elements S1 to S6 are connected in antiparallel to feedback diodes D1 to D6, respectively.

In the inverter circuit 20, the first and second switching elements S1 and S2 are connected in series to each other, the third and fourth switching elements S3 and S4 are connected in series to each other, and the fifth and sixth switching elements S5, S6 are connected in series to each other. The first, third, and fifth switching elements S1, S3, S5 are connected to the positive terminal of the battery 50, which is a direct-current power source. The second, fourth, and sixth switching elements S2, S4, S6 are connected to the negative terminal of the battery 50.

A connecting point between the switching elements S1 and S2, which form upper and lower arms for the U-phase, is connected to the U-phase terminal of the electric motor 60. A connecting point between the switching elements S3 and S4, which form upper and lower arms for the V-phase, is connected to the V-phase terminal of the electric motor 60. A connecting point between the switching elements S5 and S6, which form upper and lower arms for the W-phase, is connected to the W-phase terminal of the electric motor 60. The inverter 10 supplies alternating currents to the coils of respective phases of the electric motor 60, thereby driving the electric motor 60. As described above, the inverter circuit 20 has six switching elements S1 to S6 in a bridge connection.

The rated voltage of the battery 50 is, for example, 48 volts, and the withstand voltage of the switching elements S1 to S6 is approximately 75 volts.

Current sensors 70, 71 are provided between the inverter circuit 20 and the electric motor 60. The current sensors 70, 71 respectively detect the current values of currents Iu and Iw of the U-phase and W-phase, which are two phases of the three-phase currents Iu, Iv, Iw supplied to the electric motor 60.

An electrolytic capacitor 80 is connected to the input terminals of the inverter circuit 20 to be parallel with the battery 50. The first, third, and fifth switching elements S1, S3, S5 are connected to the positive terminal of the electrolytic capacitor 80, and the second, fourth, and the sixth switching element S2, S4, S6 are connected to the negative terminal of the electrolytic capacitor 80. In general, if a capacitor is regarded as an equivalent circuit, the capacitor can be considered as including, in addition to an ideal capacitor component, a resistance component R and an inductor component L. In FIG. 1, the electrolytic capacitor 80 is equivalently represented by an ideal capacitor C and the resistance component R, which are connected in series. The resistance component R is an equivalent series resistance (ESR) of the capacitor.

As described above, the input terminals of the inverter circuit 20 are connected to the battery 50, which serves as a direct-current power source, and the electrolytic capacitor 80, which are connected in parallel.

The controller 40 detects the voltage Vb of the inverter circuit 20. The controller 40 has a function of detecting an overvoltage (surge voltage) generated in the ESR of the electrolytic capacitor 80 by the voltage Vb and protecting the switching elements S1 to S6. When the voltage Vb is excessively high, insulation of the switching elements S1 to S6 may be broken down. Therefore, the controller 40 is configured to stop driving the inverter circuit 20 when the voltage applied to the switching elements S1 to S6 exceeds a set value due to a surge voltage.

The inverter 10 further includes a capacitor temperature sensor 90, which detects the temperature of the electrolytic capacitor 80. The capacitor temperature sensor 90, which functions as a temperature detecting section, is connected to the controller 40, so that the controller 40 detects the temperature of the electrolytic capacitor 80. When controlling the electric motor 60 to perform normal operation under a low-temperature environment, the inverter 10 functions to limit the currents output to the electric motor 60 to protect the electric motor 60 and components of the inverter 10. For example, when the temperature of the electrolytic capacitor 80 drops, for example, to or below −20° C., the output currents to the electric motor 60 are limited.

The controller 40 is constructed with a microcomputer as the dominant constituent. The controller 40 includes a memory 41. The memory 41 stores various control programs necessary for driving the electric motor 60 and various data and maps for executing the control programs. The control programs include a control program for activating the electric motor 60 in a normal state and a control program for supplying direct currents to the electric motor 60 to warm up the electric motor 60 in a cold state.

The controller 40 is connected to the gates of the switching elements S1 to S6 via the drive circuit 30. The current sensors 70, 71 are connected to the controller 40. Based on detection signals from the sensors 70, 71, the controller 40 outputs control signals to the switching elements S1 to S6 via the drive circuit 30 such that the electric motor 60 generates power of to a target level. The inverter circuit 20 converts the direct current from the battery 50 and the electrolytic capacitor 80 into alternating currents of three phases having an appropriate frequency and outputs the alternating currents to the electric motor 60.

The vehicle has a vehicle-controlling electronic control unit (ECU) 120. The vehicle-controlling ECU 120 receives operation signals from operation sensors (not shown) manipulated by the operator and controls the movement of the vehicle, accordingly. The controller 40 is connected to the vehicle-controlling ECU 120. The switching elements S1 to S6 of the inverter 10 are mounted on a main circuit board 100. The controller 40 and the drive circuit 30 of the inverter 10 are mounted on the control board 110.

Operation of the inverter 10 will now be described.

The temperature of the electrolytic capacitor 80 changes as illustrated in FIG. 2. The key of the forklift is turned ON at point in time t1 in FIG. 2. It is assumed that the capacitor temperature at this time is significantly low (for example, −40° C.). Thereafter, through the warm-up control, the capacitor temperature increases to reach a prescribed value (for example, −20° C.), or an activation permitting temperature, at point in time t2, the normal operation control is executed.

It is assumed that, after the capacitor temperature exceeds the activation permitting temperature, the forklift is left unattended at point in time t3, with the key at the on position and the electric motor 60 stopped under the low temperature environment. The stopping of the electric motor 60 causes the capacitor temperature to drop. When the capacitor temperature drops to or below the prescribed value (for example, −20° C.), the warm-up control is started.

In this manner, even if the capacitor temperature is lowered to or below the prescribed value after reaching the activation permitting temperature (for example, −20° C.), the warm-up control is started thereafter at point in time t4. Accordingly, the capacitor temperature is raised to the activation permitting temperature. Thus, when the operator resumes the operation of the forklift at point in time t5, the electric motor 60 is smoothly restarted. That is, the normal operation control is smoothly resumed. In short, if no command for activating the electric motor 60 is output by the vehicle-controlling ECU 120 and the electric motor 60 is not driven as in the period after point in time t3 in FIG. 2, the controller 40 executes the warm-up control. Through the warm-up control, the capacitor temperature is raised to a temperature at which the power output of the electric motor 60 does not need to be limited (for example, −20° C.), so that the power output limitation on the electric motor 60 is cancelled at the earliest possible time.

As described above, the present embodiment takes into consideration a case in which the inverter 10 is stopped and the capacitor temperature drops again after the capacitor temperature reaches and exceeds the activation permitting temperature in the warm-up control initiated by the activation of the forklift, which accompanies the turning ON of the key.

Figure 3A:
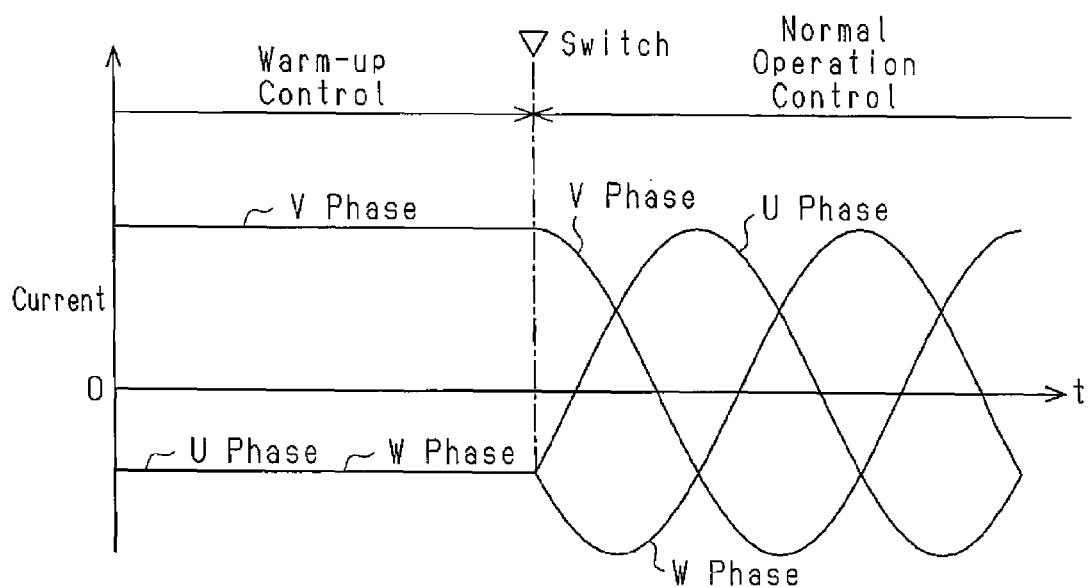
FIG. 3A is a waveform chart showing a U-phase current, a W-phase current, and a V-phase current according to the embodiment.

As shown in FIG. 3A, during the warm-up control, in which the capacitor temperature is low, the inverter 10 supplies direct currents to the electric motor 60. During the normal operation control, in which the capacitor temperature is higher than or equal to the activation permitting temperature, the inverter 10 supplies alternating currents to the electric motor 60.

The normal operation control will now be described.

When the temperature of the electrolytic capacitor 80 detected by the capacitor temperature sensor 90 is higher than a prescribed temperature (for example, −20° C.), the controller 40 simultaneously turns on the switching elements S1, S4, S6 and outputs a U-phase current Iu as represented by a line formed by a long dash alternating with a short dash in FIG. 1. The controller 40 also simultaneously turns on the switching elements S3, S2, S6 to output a V-phase current Iv. Further, the controller 40 simultaneously turns on the switching elements S5, S2, S4 to output a W-phase current Iw. In this manner, the inverter 10 inputs a direct-current voltage from the battery 50 (the electrolytic capacitor 80) and turns on and off the switching elements S1 to S6, which are in a bridge connection. The turning on and off causes the inverter 10 to supply electricity to the electric motor 60. At this time, the controller 40 adjusts the current for each to have a desired maximized value.

The regenerative electric power generated by energization of the electric motor 60 is returned to the side of the power source. That is, the regenerative electric power (regenerative current) from the electric motor 60 is stored in the electrolytic capacitor 80 via the feedback diodes D1 to D6. The regenerative energy is used in power driving.

The normal operation control will be described with reference to FIGS. 3A and 3B. When the temperature of the electrolytic capacitor 80 detected by the capacitor temperature sensor 90 is higher than the prescribed temperature (for example, −20° C.), the controller 40 turns on and off the switching elements S1 to S6 of the inverter circuit 20 such that currents of sinusoidal shapes are generated as the U-phase current Iu, the W-phase current Iw, and V-phase current Iv.

Next, the warm-up control will be described, which is executed in a period t4-t5 after the electrolytic capacitor 80 is left unattended in a low ambient temperature after being heated.

In a case in which the vehicle-controlling ECU 120 is not outputting an activation command for the electric motor 60 and the electric motor 60 is stopped, the controller 40, which functions as a warm-up control section, executes the warm-up control when the temperature of the electrolytic capacitor 80 detected by the capacitor temperature sensor 90 is lower than the prescribed temperature (for example, −20° C.). In the warm-up control, the controller 40 controls the switching elements S1 to S6 of the inverter circuit 20 to supply direct currents to the coils of respective phases of the electric motor 60, thereby warming the electrolytic capacitor 80 and switching elements S1 to S6.

In the present embodiment, the inverter 10 performs vector control. In vector control, excitation currents for generating magnetic flux and torque currents for generating torque of an electric motor are controlled independently. When the electric motor 60 is not operating and the temperature is lower than or equal to a predetermined value (for example, −20° C.), the controller 40 controls the switching elements S1 to S6 of the inverter circuit 20 to supply, to the electric motor 60, direct currents that contain no torque current component but only contain an excitation current component, so that the electric motor 60 does not rotate. Therefore, even in a case where the controller 40 does not receive a motor activation command signal from the vehicle-controlling ECU 120, currents that only contain an excitation component are supplied to the electric motor 60, so that the warm-up control (temperature increasing control) is performed without rotating the electric motor 60.

In FIG. 3A, during the warm-up control, the controller 40 controls the switching elements S1 to S6 of the inverter circuit 20 such that a direct current of the maximum value is supplied to the V-phase coil, and direct currents of a predetermined value are supplied to the coils of the other phases.

Through the warm-up control, the temperature of the electrolytic capacitor 80 is increased so that the ripple voltage accompanying an ESR increase during a low capacitor temperature state is reduced.

Next, switching at point in time t5 in FIG. 2 will be described. At point in time t5, the warm-up control, in which direct currents are supplied to the coils of the respective phases, is switched to the normal operation control, in which alternating currents are supplied to the coils of the respective phases.

When the warm-up control is switched to the normal control operation as illustrated in FIG. 3A, the controller 40, which functions as a switching control section, sets the initial phases (initial electrical degrees) of the alternating currents supplied to the respective coils of the electrical motor 60 in line with the electrical degrees (phases) of the direct currents that have been supplied to the corresponding coils of the electrical motor 60. In other words, the controller 40 sets the initial phases (initial electrical degrees) of the alternating currents supplied to the coils of the electric motor 60 such that, at switching to the normal operation control, the relationship (magnitude relationship) between the values of the alternating currents supplied to the coils of the electric motor 60 matches with the relationship between the values of the direct currents that have been supplied to the coils of the electric motor 60 in the warm-up control. This reduces the shock generated in the electric motor 60 at the switching of the control.

Figure 3B:
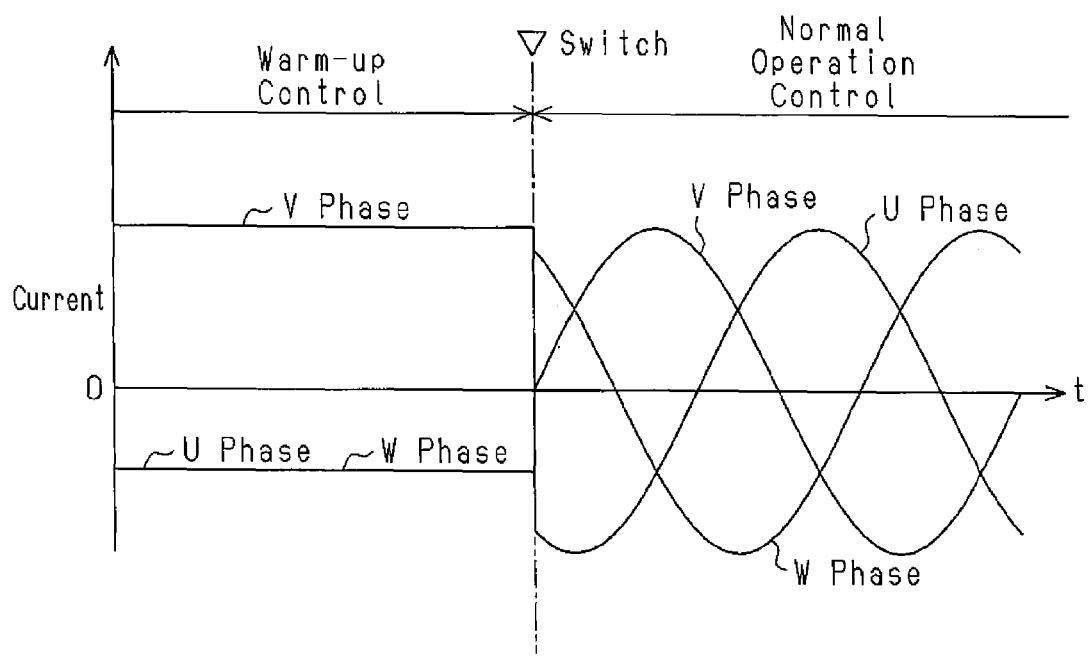
FIG. 3B is a waveform chart showing a U-phase current, a W-phase current, and a V-phase current in a case to be compared with the embodiment.

That is, if the phases (electrical degrees) are different between the warm-up control and the beginning of the normal operation control, a great shock is generated in the electric motor at the beginning of the normal operation control as shown in FIG. 3B. In other words, if the relationship between the current values of the phases in the warm-up control is different from the relationship between the current values of the corresponding phases in the normal operation control, a great shock will be generated at the beginning of the normal operation control. In contrast, in the present embodiment, the phases (electrical degrees) in the warm-up control are the same as the phase (electrical degrees) at the beginning of the normal operation control, and the electrical degrees are matched with each other. In other words, as shown in FIG. 3A, the electrical degrees of the alternating currents are set such that the current values of the corresponding phases are equal between the warm-up control and the beginning of the normal operation control. Thus, the shock generated in the electrical motor 60 at switching to the normal operation control is small. This improves the ride quality of the forklift on which the electrical motor 60 is mounted.

In FIG. 3A, the current values remain the same before and after switching to the normal operation control. However, the current values may be different before and after switching to the normal operation control. In short, at switching to the normal operation control, it is sufficient if the relationship between the initial values of the alternating currents supplied to the coils of the electric motor 60 is the same as the relationship between the values of the direct currents supplied to the corresponding coils in the electric motor 60 during the warm-up control. Specifically, it is sufficient if, before and after the switching to the normal operation control, the relationship between the current values of U-phase, V-phase, and W-phase is maintained. In the case of FIG. 3A, the current value of the U-phase in the warm-up control is the highest among the current values of the U-phase, V-phase, and the W-phase, and the current values of the V-phase and the W-phase are lower than the current value of the U-phase and equal to each other. Therefore, the current value of each phase does not necessarily remain the same before and after the switching as long as the current value of the U-phase in the warm-up control remains the highest among the current values of the U-phase, V-phase, and the W-phase, and the current values of the V-phase and the W-phase remain lower than the current value of the U-phase and equal to each other.

After point in time t4 in FIG. 2, the warm-up control is performed, in which a direct current is supplied to each coil of the electric motor 60. In this warm-up control, if the accelerator pedal is depressed, a command for activating the electric motor 60 is supplied to the controller 40. That is, an activation command signal for activating the electric motor 60 is supplied to the controller 40 from the vehicle-controlling ECU 120. In such a case, the controller 40 executes the following control procedure. The controller 40 first stops the warm-up control and switches to the normal operation control. That is, when the operator of the forklift manipulates the operating system during the warm-up control, the responsiveness to the manipulation is given priority, and the warm-up control is stopped and immediately shifted to the normal operation control. This improves the operability of the forklift on which the electric motor 60 is mounted. In this case also, when the warm-up control is switched to the normal control operation, the controller 40 sets the initial phases of the alternating currents supplied to the respective coils of the electrical motor 60 in line with the electrical degrees of the direct currents that have been supplied to the respective coils of the electrical motor 60. In other words, the controller 40 sets the initial phases of the alternating currents supplied to the coils of the electric motor 60 such that, at switching to the normal operation control, the relationship between the values of the alternating currents supplied to the coils of the electric motor 60 matches with the relationship between the values of the direct currents that have been supplied to the coils of the electric motor 60 in the warm-up control.

Figure 4:
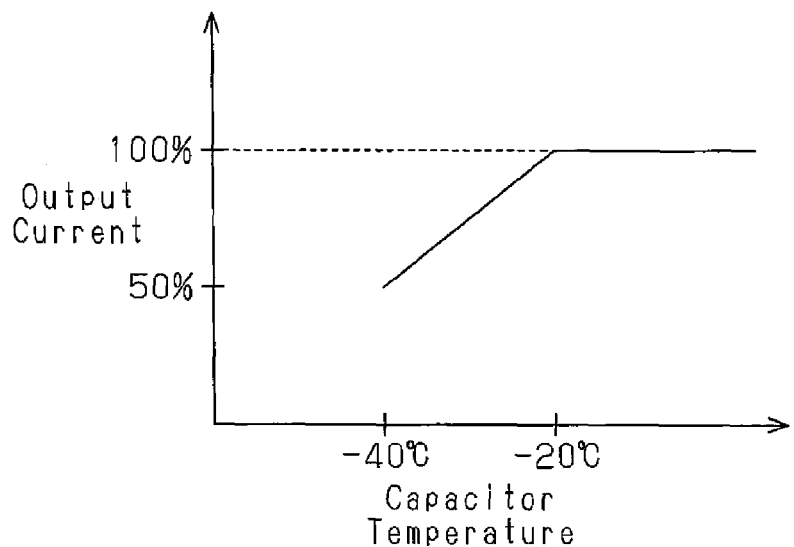
FIG. 4 is a graph showing the relationship between the capacitor temperature and an output current.

In a case in which the capacitor temperature detected by the capacitor temperature sensor 90 has not reached the activation permitting temperature when the warm-up control is stopped due to an operation command by the operator, the controller 40 executes the following control if the capacitor temperature shown in FIG. 4 is lower than −20° C. The controller 40 switches the control mode from the warm-up control to the normal operation control and limits the output currents supplied to the respective coils of the electric motor 60 based on the current capacitor temperature detected by the capacitor temperature sensor 90. Specifically, the map shown in FIG. 4 is used for limiting the output currents. FIG. 4 shows the relationship between the capacitor temperature and an output current. When the capacitor temperature is higher than or equal to the activation permitting temperature (for example, higher than or equal to −20° C.), the inverter 10 is allowed to output currents at full power (100%). When the capacitor temperature is lower than the activation permitting temperature (lower than −20° C.), the output currents are limited such that the lower the capacitor temperature, the lower the output currents become. For example, when the capacitor temperature is −40° C., the output currents are limited to 50%. The limitation on the output currents reduces the ripple voltage accompanying an ESR increase during a capacitor low temperature state.

The above described embodiment has the following advantages.

(1) The inverter 10 has the capacitor temperature sensor 90 and the controller 40. When the electric motor 60 is not operating, the controller 40, which functions as the warm-up control section, executes the following control if the temperature of the electrolytic capacitor 80 detected by the capacitor temperature sensor 90 is lower than the prescribed temperature. The inverter 10 controls the switching elements S1, S2, S3, S4, S5, and S6 of the inverter circuit 20 to supply direct currents to the coils of the respective phases of the electric motor 60. Therefore, if the electrolytic capacitor 80 is left unattended in a cold temperature environment after being heated, the warm-up can be performed by supplying the direct currents. When switching from the warm-up control to the normal control operation, the controller 40, which functions as the switching control section, sets the initial phases of the alternating currents supplied to the coils of the electrical motor 60 in line with the electrical degrees of the direct currents that have been supplied to the coils of the electrical motor 60. In other words, when switching from the warm-up control to the normal operation control, the controller 40 sets the initial phases of the alternating currents such that the relationship between the values of the alternating currents supplied to the coils of the electric motor 60 matches with the relationship between the values of the direct currents that have been supplied to the corresponding coils of the electric motor 60 in the warm-up control. This allows the warm-up control to be smoothly switched to the normal operation control. Accordingly, it is possible to smoothly shift from the warm-up control to the normal operation control while taking into consideration a case in which the electrolytic capacitor 80 is put under a low-temperature environment after being heated.

(2) When supplying direct currents to the coils of the respective phases of the electric motor 60, the controller 40, which functions as the warm-up control section, controls the switching elements S1 to S6 of the inverter circuit 20 such that direct currents that contain no torque current component but only contain an excitation current component are supplied to the electric motor 60. Therefore, the electric motor 60 is not rotated.

(3) In the warm-up control, the controller 40, which functions as the warm-up control section, supplies direct currents to the coils of the respective phases of the electric motor 60. If a command for activating the electric motor 60 is generated during the warm-up control, the controller 40, which functions as a normal operation control starting section, stops the warm-up control and switches to the normal operation control. Therefore, the warm-up control can be switched to the normal operation control by a command for activating the electric motor 60, which is generated by manipulation made by the operator.

(4) If the temperature of the electrolytic capacitor 80 detected by the capacitor temperature sensor 90 when the warm-up control is stopped has not reached the target temperature, the controller 40, which functions as an output limiting section, limits output currents supplied to the coils of the respective phases of the electric motor based on the temperature of the electrolytic capacitor 80 detected by the capacitor temperature sensor 90 in the subsequent normal operation control. Accordingly, the output currents supplied to the coils of the respective phases of the electric motor 60 can be limited based on the capacitor temperature, so that the ripple voltage in the ESR is reduced.

The present invention is not limited to the embodiment described above, but may be embodied as follows, for example.

Figure 5:
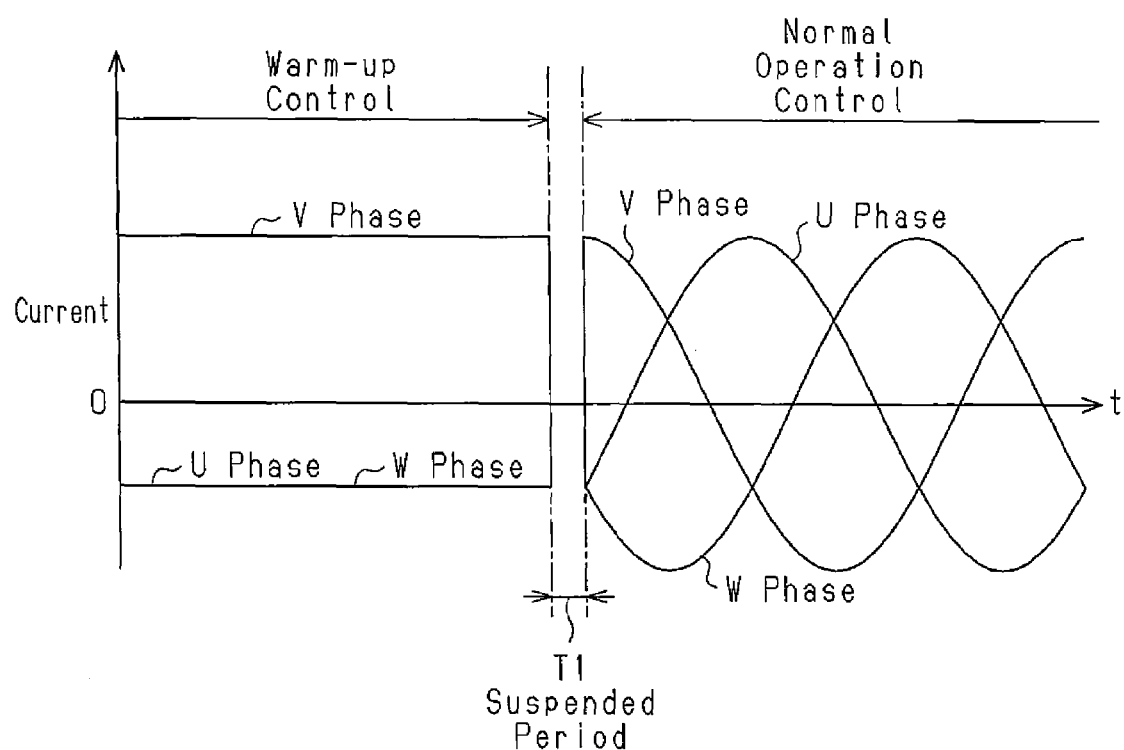
FIG. 5 is a waveform chart showing a U-phase current, a W-phase current, and a V-phase current according to a modified embodiment.

As shown in FIG. 5, the controller 40, which functions as the switching control section, may provide a suspended period T1, in which no current is supplied to the coils of the electric motor 60, when switching from the warm-up control to the normal operation control.

As shown in FIG. 1, the inverter 10 may include a temperature sensor 91 serving as a peripheral device temperature detecting section. The temperature sensor 91 detects the temperature of capacitor peripheral devices other than the electrolytic capacitor 80 (a functional component such as the electric motor 60, switching elements S1 to S6, and the control board 110). In the warm-up control, in which the controller 40, which functions as the warm-up control section, supplies direct currents to the coils of the respective phases of the electric motor 60, the controller 40, which functions as a warm-up control stopping section, may stop the warm-up control if the temperature of a capacitor peripheral device detected by the temperature sensor 91 exceeds a threshold temperature. In this case, the capacitor peripheral device is prevented from being overheated.

More specifically, during the warm-up control, the temperature of each of the electric motor 60, the switching elements S1 to S6, and the control board 110 is monitored. In particular, the temperature of the coils of the electric motor 60, the temperature of the main circuit board 100, on which the switching elements S1 to S6 are mounted, and the temperature of the control board 110 are detected by the temperature sensor 91. When the temperature of any of the electric motor 60, the switching elements S1 to S6, and the control board 110 is higher than or equal to the prescribed temperature, the controller 40 stops the warm-up control.

At this time, if the operator performs no manipulation and there is no command for activating the electric motor 60, the controller 40 enters the suspended period (refer to the suspended period T1 in FIG. 5), during which no current is supplied to the coils of the electric motor 60.

In contrast, when there is a motor activating command due to manipulation made by the operator, the controller 40 performs the normal operation control with limitation on the output currents as illustrated in the map of FIG. 4. Specifically, in FIG. 4, when the capacitor temperature is higher than or equal to −20° C., the controller 40 sets the output currents to at full power (100%). When the capacitor temperature is lower than −20° C., the controller 40 sets the output currents such that the lower the capacitor temperature, the lower the output currents become. That is, if the temperature of the electrolytic capacitor 80 when the warm-up control is stopped has not reached the target temperature, the output currents supplied to the coils of the respective phases of the electric motor in the subsequent normal operation control are limited based on the temperature of the electrolytic capacitor 80. The limitation on the output currents reduces the ripple voltage generated in the ESR.

The electric motor 60 is not particularly limited to a specific type, but may be of any type.

Therefore, the present examples and embodiments are to be considered as illustrative and not restrictive and the invention is not to be limited to the details given herein, but may be modified within the scope and equivalence of the appended claims.

The invention claimed is:

1. An inverter adapted for supplying alternating currents to an electric motor having coils forming a plurality of phases to drive the electric motor, the inverter comprising:

an inverter circuit having a plurality of switching elements in a bridge connection, wherein the inverter circuit has a pair of input terminals, which is configured to be connected to a direct-current power source, and a plurality of output terminals, which are configured to be connected to the coils of the respective phases of the electric motor;

a capacitor, which is connected to the input terminals of the inverter circuit;

a temperature detecting section, which detects a temperature of the capacitor;

a warm-up control section, wherein, in a state in which the electric motor is not operating, the warm-up control section controls the switching elements of the inverter circuit to perform warm-up control, in which direct currents are supplied to the coils of the respective phases of the electric motor, when the temperature of the capacitor detected by the temperature detecting section is lower than a prescribed temperature; and a switching control section, wherein, when the warm-up control is switched to a normal operation control, in which alternating currents are supplied to the coils of the respective phases of the electric motor, the switching control section sets initial phases of the alternating currents such that the relationship between the values of the alternating currents supplied to the coils of the electric motor in the normal operation control matches with the relationship between the values of the direct currents that have been supplied to the corresponding coils of the electric motor in the warm-up control.

2. The inverter according to claim 1, further comprising a normal operation control starting section, wherein, if a command for activating the electric motor is generated during the warm-up control, the normal operation control starting section stops the warm-up control and switches to the normal operation control.

3. The inverter according to claim 1, further comprising:
a peripheral device temperature detecting section for detecting a temperature of a peripheral device other than the capacitor in the inverter; and
a warm-up control stopping section, wherein, when the temperature of the peripheral device of the capacitor detected by the peripheral device temperature detecting section exceeds a threshold value during the warm-up control, the warm-up control stopping section stops the warm-up control.

4. The inverter according to claim 1, further comprising an output limiting section, wherein, if the temperature of the capacitor detected by the temperature detection section when the warm-up control is stopped has not reached a target temperature, the output limiting section limits output currents supplied to the coils of the respective phases of the electric motor in the subsequent normal operation control based on the temperature of the capacitor detected by the temperature detecting section.

5. The inverter according to claim 1, wherein, when switching from the warm-up control to the normal operation control, the switching control section provides a suspended period, in which no current is supplied to the coils of the electric motor.

6. The inverter according to claim 1, wherein, when supplying direct currents to the coils of the respective phases of the electric motor, the warm-up control section controls the switching elements of the inverter circuit such that direct currents that contain no torque current component but only contain an excitation current component are supplied to the electric motor.

7. The inverter according to claim 1, wherein, at switching to the normal operation control, the values of the alternating currents supplied to the coils of the electric motor are equal to the values of the direct currents that have been supplied to the corresponding coils of the electric motor in the warm-up control.

8. The inverter according to claim 1, wherein the relationship between the current values is a magnitude relationship.

9. An inverter adapted for supplying alternating currents to an electric motor having coils forming a plurality of phases to drive the electric motor, the inverter comprising:
an inverter circuit having a plurality of switching elements in a bridge connection, wherein the inverter circuit has a pair of input terminals, which is configured to be connected to a direct-current power source, and a plurality of output terminals, which are configured to be connected to the coils of the respective phases of the electric motor;
a capacitor, which is connected to the pair of input terminals of the inverter circuit;
a temperature detecting section, which detects a temperature of the capacitor;
a warm-up control section, wherein, in a state in which the electric motor is not operating, the warm-up control section controls the switching elements of the inverter circuit to perform warm-up control, in which direct currents are supplied to the coils of the respective phases of the electric motor, when the temperature of the capacitor detected by the temperature detecting section is lower than a prescribed temperature; and
a switching control section, wherein, when the warm-up control is switched to a normal operation control, in which alternating currents are supplied to the coils of the respective phases of the electric motor, the switching control section sets initial phases of the alternating currents supplied to the respective coils of the electrical motor in the normal operation control in line with the electrical degrees of the direct currents that have been supplied to the respective coils of the electrical motor in the warm-up control.

* * * * *